Nov. 4, 1958   H. A. McANINCH ET AL   2,858,712
TRANSMISSION
Filed Dec. 13, 1956   2 Sheets-Sheet 1
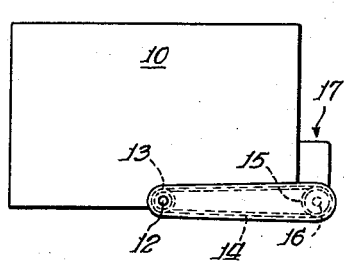
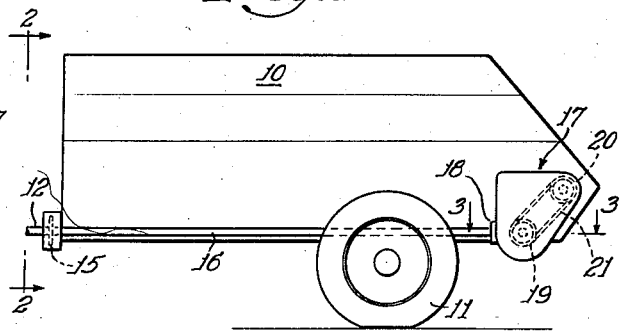
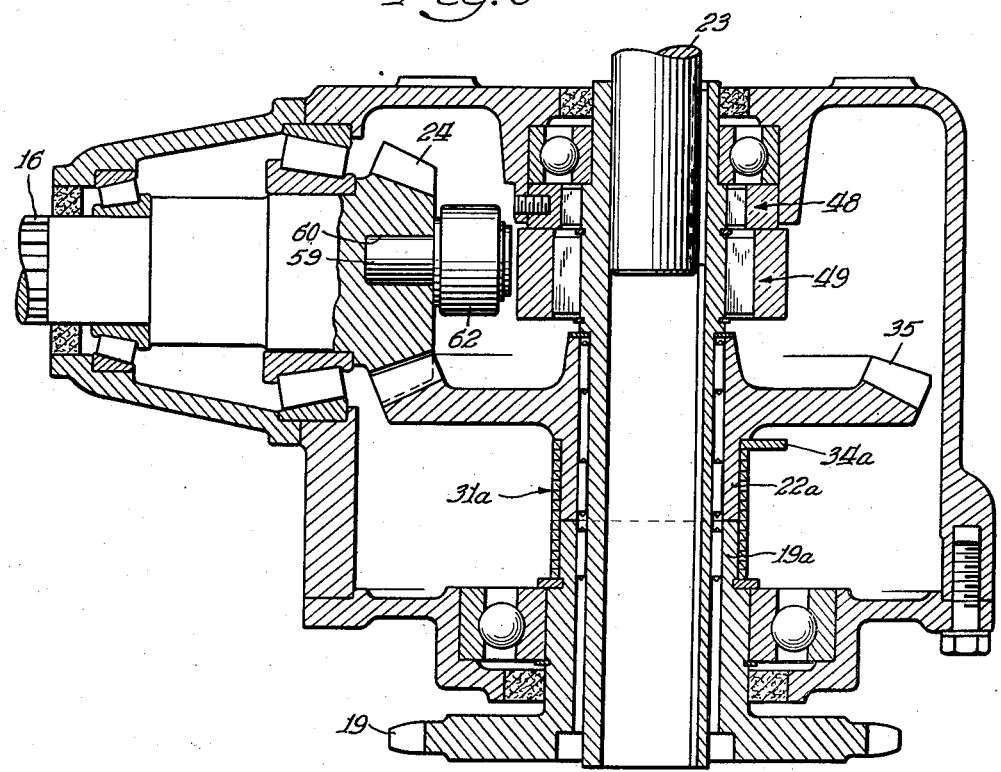
Inventors:
Herbert A. McAninch
and Verle M. Tharpe
By: Frank C. Parker
Atty.

Nov. 4, 1958    H. A. McANINCH ET AL    2,858,712
TRANSMISSION
Filed Dec. 13, 1956    2 Sheets-Sheet 2
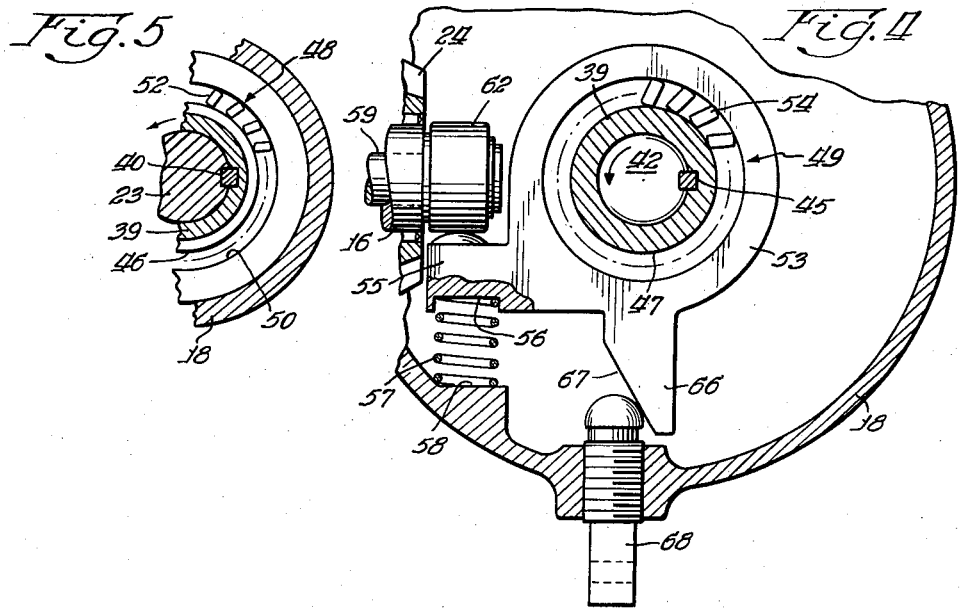
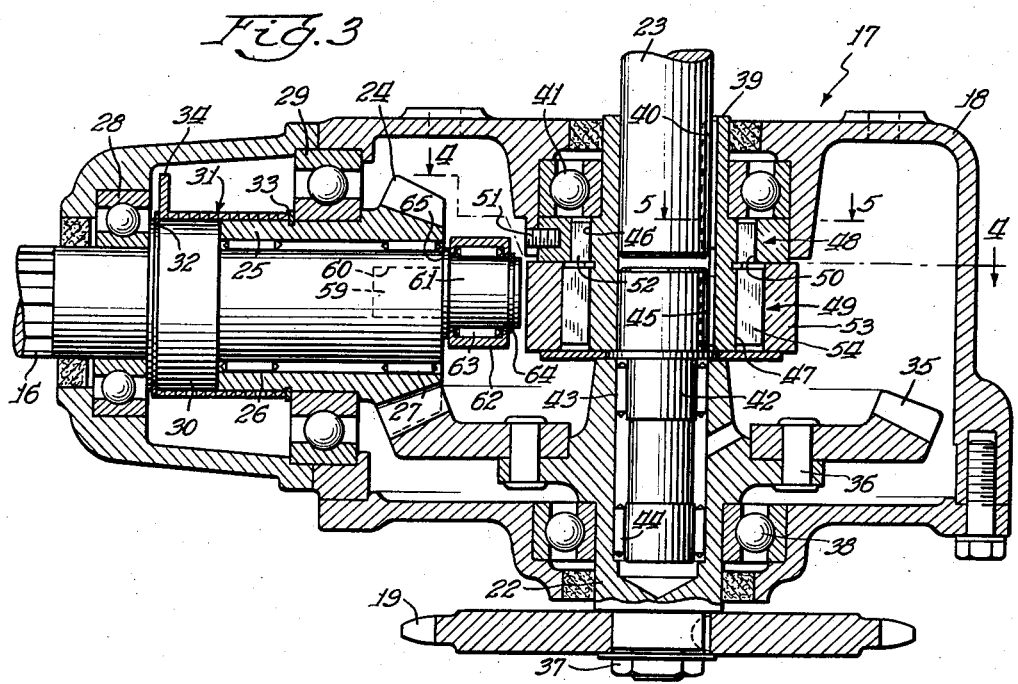
Inventors:
Herbert A. McAninch
and Verle M. Tharpe
By: Frank C. Parker
Atty.

United States Patent Office 2,858,712
Patented Nov. 4, 1958

2,858,712

TRANSMISSION

Herbert A. McAninch and Verle M. Tharpe, Auburn, Ind., assignors to Borg-Warner Corporation, Chicago, Ill., a corporation of Illinois Application December 13, 1956, Serial No. 628,025

16 Claims. (Cl. 74—665)

The present invention relates to transmissions and is particularly concerned with transmissions suitable for use on manure spreaders having spreading beaters and an unloading apron.

The principal object of the present invention is to provide an improved transmission for use particularly on manure spreaders.

It has been conventional practice in the agricultural equipment field to provide manure spreaders with transmissions including means for varying the speed of advance of the unloading apron, however, in most instances the number of speeds obtainable are limited and usually comprise three to five different speeds, as a maximum. Due to this limitation on the variation in the speed at which the unloading apron can be driven, it will be readily understood that frequently one apron speed will be too low whereas the next higher speed will be too high and it will be impossible to get the exact apron speed which will be desired. The present invention includes means for enabling substantially infinite variation in the number of apron speeds between a stationary apron and maximum speed of advance of the apron.

A further object of the present invention is to utilize a pair of one-way engaging devices in the drive mechanism for driving the manure spreader apron, one of the one-way engaging devices being employed to effect incremental advance of the apron and the other of the one-way engaging devices being employed for preventing backlash or reverse movement of the apron between successive incremental advances of the apron. Such a backlash preventing one-way engaging device is deemed to be essential inasmuch as there is considerable resistance to movement of the apron, particularly when the spreader is full. The backlash preventing one-way engaging device insures that the apron will not merely reciprocate back and forth without ultimate forward or unloading movement.

It is a further object of the present invention to provide a transmission for manure spreaders which includes a helical spring type one-way clutch disengageable manually whenever it is desired to operate the unloading apron without actuating the spreading beaters. In this way, the manure spreader can be utilized as a conventional farm wagon with an automatic unloader.

The foregoing objects and advantages and numerous others will become apparent from the following detailed description, when read in conjunction with the accompanying drawings, wherein:

Fig. 1 is a schematic side elevational view of a typical manure spreader adapted to be drawn by a conventional farm tractor;

Fig. 2 is a front elevational view of the manure spreader shown in Fig. 1 and taken substantially along the lines 2—2 and looking in the direction of the arrows;

Fig. 3 is a sectional view illustrating the general features of one form of the improved transmission comprising the subject matter of the present invention;

Fig. 4 is a sectional view taken substantially along the lines 4—4 in Fig. 3 and looking in the direction of the arrows;

Fig. 5 is a sectional view taken substantially along the lines 5—5 in Fig. 3 and looking in the direction of the arrows; and Fig. 6 is a sectional view illustrating a modified form of transmission but utilizing the features comprising the subject matter of the present invention.

Like reference numerals in the different views have been utilized to identify identical parts.

With reference now to the drawings, the manure spreader illustrated in Figs. 1 and 2 comprises a body designated by reference numeral 10 supported by a pair of wheels 11. The manure spreader 10 is of the type adapted to be drawn by a conventional farm tractor provided with a power take off shaft and the power take off shaft of the tractor is adapted to directly drive a shaft 12 projecting forwardly from substantially the center of the manure spreader body 10. The shaft 12 is provided with a sprocket 13 around which a chain 14 passes and the chain 14 also passes around a second sprocket 15 mounted on the end of a shaft 16 disposed along one side of the manure spreader body 10 and leading toward the rear end thereof. The shaft 16 comprises the input shaft of the transmission mechanism designated generally by reference numeral 17 and comprising the subject matter of the present invention.

The transmission mechanism 17 is disposed within a suitable transmission case 18 and also includes a pair of sprockets 19 and 20 which are drivingly interconnected with each other by means of a suitable drive chain 21. The sprocket 20 is mounted on one end of a spreading beater shaft (not shown) and at the opposite side of the manure spreader box or body 10 this operating beater shaft is provided with another sprocket, around which a second chain passes in order to transmit a drive to another operating beater. The beater structure is conventional in manure spreaders and it is not deemed essential to include any further details thereof in the present specification.

The embodiment of the invention disclosed in Fig. 3 will first be described and in addition to the structure already referred to, the transmission shown in Fig. 3 includes first and second drive members 22 and 23. A pinion gear 24, formed on the end of a short sleeve shaft 25 is rotatably mounted on shaft 16 by means of needle bearings 26 and 27. The shaft 16 is rotatably mounted within the transmission casing 18 by means of ball bearings 28 and the concentric shaft 25 is rotatably mounted within the transmission casing 18 by means of ball bearing 29. The two sets of ball bearings 28 and 29 therefore rotatably mount the drive shaft 16, shaft 25 and pinion gear 24 rotatably within the transmission casing 18. The shaft 16 is formed with a hub 30 integrally connected therewith and this hub is disposed in alignment with the end of shaft 25. A helical spring type one-way clutch designated generally by reference numeral 31 is disposed around the hub 30 and the aligned end of sleeve shaft 25. A pair of stop rings 32 and 33 prevent axial displacement of the helical spring type clutch 31 and a projection 34 on one end of the clutch spring 31 is provided for enabling the manual disengagement of the clutch 31.

Under normal circumstances with the input shaft 16 driven forwardly, the one-way clutch 31 will be engaged and will tightly wrap around the hub 30 and the outer periphery of sleeve shaft 25, in order to effect a driving connection between shaft 16 and pinion gear 24. Suitable means (not shown) will be provided for manually engaging the end 34 of spring 31 in order to disengage the spring from the hub 30 and thereby break the driving connection between shaft 16 and pin 24. The first driven member 22 comprises a ring gear 35 interconnected with the driven member or sleeve 22 by means of a plurality of connecting pins 36 and the sprocket 19 is secured outside of the transmission casing 18 on the end of the driven shaft 22 by means of a nut 37 threaded on the end of shaft 22. The shaft 22 is rotatably mounted within the transmission casing 18 by means of ball bearings 38.

The second driven member 23 which drives the apron includes a short sleeve shaft 39 splined to shaft 23, as indicated at 40, and the shaft 39 is rotatably mounted within the transmission casing by means of ball bearings 41. A short aligning shaft 42 concentrically disposed within shaft 22 and rotatably mounted with respect thereto by means of needle bearings 43 and 44, extends into sleeve shaft 39 and is splined thereto by means of a suitable spline 45. The shaft 42 functions in cooperation with sleeve shafts 39 and 22 to maintain alignment of all three of these shafts within the transmisison case, and all three of them are held with respect to the casing by means of ball bearing elements 38 and 41.

The sleeve shaft 39 is formed with two external cylindrical races 46 and 47 which respectively form the internal races of a pair of one-way engaging devices 48 and 49. The one-way engaging device 48 also includes an outer cylindrical race 50 which is held fixed with respect to the transmission casing 18 by means of a suitable set screw 51. The one-way engaging device 48 also includes a plurality of tiltable wedging elements or sprags 52, the entire one-way engaging device 48 being of conventional construction and it, therefore, not being deemed necessary to describe the details thereof in any greater detail. It will suffice to say that the one-way engaging device 48 comprises a one-way brake effective to allow the sleeve 39 to rotate counter-clockwise, as viewed in Fig. 5, and to prevent rotation of sleeve shaft 39 in a clockwise direction due to a tendency under these circumstances for the sprags or wedging elements 52 to tilt and become wedgingly engaged between the races 46 and 50.

The second one-way engaging device 49 includes an outer cylindrical race member 53 as well as a plurality of tiltable sprags of wedging elements 54 which are adapted to permit relative rotation of sleeve 39 in a counter-clockwise direction relative to the race member 53 but which are adapted to lock up and prevent rotation of the sleeve shaft 39 in a clockwise direction relative to race member 53. It will be understood that the one-way engaging device 49 is also of conventional construction and it is not deemed necessary to describe it at this point in any greater detail. It will, of course, also be understood that the present invention contemplates that any one-way engaging device capable of effecting engagement between the race members at any relative rotational position between the members will come within the scope of the present invention.

The outer race member 53 is provided with a generally radially extending lug 55 which is formed with a depression 56 for seating a compression spring 57. The compression spring 57 also abuts a projection 58 formed on the inside of the transmission casing 18 and the compression spring 57 thus constantly biases the race member 53 in a clockwise direction, the direction which tends to effect disengagement of the one-way engaging device 49.

A pin 59 is disposed within a bore 60 formed in the end of shaft 16, the bore 60 being off-center with respect to the center of rotation of the shaft 16 so that the pin 59 is eccentric with respect to the shaft 16. The pin 59 is formed with a hub 61 on its projecting end and a cylindrical sleeve member 62 is rotatably mounted on the hub 61 by means of needle bearings 63. Suitable stop rings 64 and 65 are provided for holding the cylindrical sleeve 62 fixed axially with respect to the hub 61. The sleeve 62 is disposed so as to abut the projecting lug 55 on the outer race member 53 and upon rotation of shaft 16 the eccentrically disposed sleeve 62 will successively, with each revolution of shaft 16, nudge the projecting lug 55 downwardly (as viewed in Fig. 4) against the biasing force exerted by the compression spring 57 and thereby effect counter-clockwise rotation of the outer race member 53. The counter-clockwise rotation of the outer race member 53 will cause the one-way engaging device 49 to lock the race member 53 with respect to the sleeve shaft 39 and thereby tend to drive the sleeve shaft 39 an incremental amount, as determined by the throw of projecting lug 55 under the urging of the eccentric sleeve 62.

In order to provide adjustment for the throw of the race member 53 by the eccentric sleeve 62, a second projecting lug 66 is formed on the outer race member 53. The projecting lug 66 is formed with a cam surface 67 thereon adapted to cooperate with a set screw or bolt 68 threaded into a suitable opening formed in the transmission casing 18. It will be apparent from Fig. 4 that by turning the bolt or set screw 68 inwardly or outwardly the cooperative cam surface 67 will function to permit greater or less clockwise return of the race member 53 under the urging of spring 57 when the dwell of eccentric sleeve 62 recedes from the lug 55. Due to the cam and set screw adjusting mechanism, it is possible to provide infinite adjustment in the throw of the outer race member 53 by eccentric sleeve 62 from no throw at all up to a maximum amount. Obviously, this overcomes one of the most serious drawbacks in prior art structures which provide only a limited number of speeds for operating the unloading apron.

It will be understood that while the manure spreader is fully loaded there will be tremendous resistance to movement of the unloading apron and, as a matter of fact, the resilience of the apron itself after each incremental rotational advance of the apron drive shaft 23 would normally tend to return the shaft 23 when it is released by the one-way engaging device 49, but due to the provision of the one-way brake 48, this backlash or reverse rotation of shaft 23 upon recession of the eccentric sleeve 62 is prevented.

The embodiment of the invention shown in Fig. 6 is similar in all respects with the embodiment shown in Fig. 3, differing therefrom essentially only in the location of the helical spring type manually disengageable one-way clutch between the drive shaft 16 and the first driven member 22 and sprocket 19. In the embodiment of the invention shown in Fig. 6, the helical spring type one-way clutch 31a is disposed around abutting ends of sleeve shaft 22a and 19a and is adapted normally to directly interconnect these two shafts in order to complete a drive from the drive shaft 16 to the sprocket 19. By manual manipulation of the projection 34a, the one-way clutch 31a can be disengaged.

From the foregoing description of the present invention it will be apparent that it provides an improved transmission particularly adapted for actuating the unloading apron and the spreading beaters of a manure spreader of the type adapted to be drawn by a tractor provided with a power take off shaft which drives the transmission.

It is contemplated that numerous changes and modifications may be made in the present invention without departing from the spirit or scope thereof.

What is claimed is:

1. A transmission comprising a drive shaft, first and second driven members, means including reduction gearing drivingly interconnecting said drive shaft and said first driven member, and means drivingly interconnecting said drive shaft and said second driven member, said last-named means comprising a first one-way engaging device operatively interconnected between a stationary part of said transmission and the second driven member for preventing reverse rotation or backlash of the second driven member, a second one-way engaging device drivingly connected with said second driven member, and oscillatable means actuated by said drive shaft for incrementally engaging and driving said second one-way engaging device and, in turn, rotating said second driven member, whereby said first one-way engaging device is effective between each successive incremental engagement of said second one-way engaging device for preventing reverse rotation of the second driven member.

2. A transmission comprising a drive shaft, first and second driven members, means including reduction gearing drivingly interconnecting said drive shaft and said first driven member, and means drivingly interconnecting said drive shaft and said second driven member, said last-named means comprising a first one-way engaging device operatively interconnected between a stationary part of said transmission and the second driven member for preventing reverse rotation or backlash of the second driven member, a second one-way engaging device drivingly connected with said second driven member, oscillatable means actuated by said drive shaft for incrementally engaging and driving said second one-way engaging device and, in turn, rotating said second driven member, whereby said first one-way engaging device is effective between each successive incremental engagement of said second one-way engaging device for preventing reverse rotation of the second driven member, and means for varying the effective length of the stroke of the reciprocable means for thereby changing the rate of rotation of said second driven member.

3. A transmission comprising a drive shaft, first and second driven members, means including reduction gearing drivingly interconnecting said drive shaft and said first driven member, and means drivingly interconnecting said drive shaft and said second driven member, said last-named means comprising a first one-way engaging device operatively interconnected between a stationary part of said transmission and the second driven member for preventing reverse rotation or backlash of the second driven member, a second one-way engaging device drivingly connected with said second driven member, and an eccentric means actuated by said drive shaft for incrementally engaging and driving said second one-way engaging device and, in turn, rotating said second driven member, whereby said first one-way engaging device is effective between each successive incremental engagement of said second one-way engaging device for preventing reverse rotation of the second driven member.

4. A transmission comprising a drive shaft, first and second driven members, means including reduction gearing drivingly interconnecting said drive shaft and said first driven-member, and means drivingly interconnecting said drive shaft and said second driven member, said last-named means comprising a pair of one-way engaging devices each having a pair of substantially concentric races with a plurality of wedging devices disposed therebetween and adapted to move in one direction into wedging engagement with the races to establish a drive between the races in one direction of rotation and to move in the opposite direction to permit relative rotation between the races, one of the races of each of said one-way engaging devices being directly connected with said second driven member, the other race of one of the one-way engaging devices being fixed to a stationary part of the transmission for preventing rotation of the second driven member in a reverse direction, means normally effective to bias the other race of the other one-way engaging device in a direction tending to cause disengagement thereof, and means driven by said drive shaft for successively nudging the other race of the other one-way engaging device in opposition to said biasing means for thereby incrementally rotatably advancing said second driven member, whereby said one-way engaging device is effective between each successive nudging for preventing reverse rotation of the second driven member.

5. A transmission comprising a drive shaft, first and second driven members, means including reduction gearing drivingly interconnecting said drive shaft and said first driven member, and means drivingly interconnecting said drive shaft and said second driven member, said last-named means comprising a pair of one-way engaging devices each having a pair of substantially concentric races with a plurality of tiltable wedging devices disposed therebetween and adapted to tilt in one direction into wedging engagement with the races to establish a drive between the races in one direction of rotation and to tilt in the opposite direction to permit relative rotation between the races, the inner race of each of said one-way engaging devices being directly connected with said second driven member, the outer race of one of the one-way engaging devices being fixed to a stationary part of the transmission for preventing rotation of the second driven member in a reverse direction, means normally effective to bias the outer race of the other one-way engaging device in a direction tending to cause disengagement thereof, and means driven by said drive shaft for successively nudging the outer race of the other one-way engaging device in opposition to said biasing means for thereby incrementally rotatably advancing said second driven member, whereby said one one-way engaging device is effective between each successive nudging for preventing reverse rotation of the second driven member.

6. A transmission comprising a drive shaft, first and second driven members, means including reduction gearing drivingly interconnecting said drive shaft and said first driven member, and means drivingly interconnecting said drive shaft and said second driven member, said last-named means comprising a pair of one-way engaging devices each having a pair of substantially concentric races with a plurality of tiltable wedging devices disposed therebetween and adapted to tilt in one direction into wedging engagement with the races to establish a drive between the races in one direction of rotation and to tilt in the opposite direction to permit relative rotation between the races, the inner race of each of said one-way engaging devices being directly connected with said second driven member, the outer race of one of the one-way engaging devices being fixed to a stationary part of the transmission for preventing rotation of the second driven member in a reverse direction, the outer race of the other one-way engaging device having a lug projecting therefrom, resilient means operatively disposed between said projecting lug and a stationary part of the transmission and normally effective to bias the outer race of the other one-way engaging device in a direction tending to cause disengagement thereof, and eccentric means driven by said drive shaft for successively nudging the said lug in opposition to said biasing means for thereby incrementally rotatably advancing said second driven member, whereby said one one-way engaging device is effective between each successive nudging for preventing reverse rotation of the second driven member.

7. A transmission comprising a drive shaft, first and second driven members, means including reduction gearing drivingly interconnecting said drive shaft and said first driven member, and means drivingly interconnecting said drive shaft and said second driven member, said last-named means comprising a pair of one-way engaging devices each having a pair of substantially cylindrical concentric races with a plurality of tiltable wedging devices disposed therebetween and adapted to tilt in one direction into wedging engagement with the races to establish a drive between the races in one direction of rotation and to tilt in the opposite direction to permit relative rotation between the races, the inner race of each of said one-way engaging devices being formed on said second driven member, the outer race of one of the one-way engaging devices being fixed to a stationary part of the transmission for preventing rotation of the second driven member in a reverse direction, the outer race of the other one-way engaging device having a lug projecting therefrom, resilient means operatively disposed between said projecting lug and a stationary part of the transmission and normally effective to bias the outer race of the other one-way engaging device in a direction tending to cause disengagement thereof, eccentric means driven by said drive shaft for successively nudging said lug in opposition to said biasing means for thereby incrementally rotatably advancing said second driven member, whereby said one one-way engaging device is effective between each successive nudging for preventing reverse rotation of the second driven member, and means for adjusting the return throw of said outer race of the other one-way engaging device by said biasing means for thereby controlling the amount of each incremental advance of said second driven member and, in turn, controlling the rate of rotation thereof.

8. A transmission comprising, a drive shaft, first and second driven members, means including reduction gearing drivingly interconnecting said drive shaft and said first driven member, and means drivingly interconnecting said drive shaft and said second driven member, said last-named means comprising a pair of one-way engaging devices each having a pair of substantially concentric races with a plurality of tiltable wedging devices disposed therebetween and adapted to tilt in one direction into wedging engagement with the races to establish a drive between the races in one direction of rotation and to tilt in the opposite direction to permit relative rotation between the races, one of the races of each of said one-way engaging devices being directly connected with said second driven member, the other race of one of the one-way engaging devices being fixed to a stationary part of the transmission for preventing rotation of the second driven member in a reverse direction, means normally effective to bias the other race of the other one-way engaging device in a direction tending to cause disengagement thereof, means driven by said drive shaft for successively nudging the other race of the other one-way engaging device in opposition to said biasing means for thereby incrementally rotatably advancing said second driven member, whereby said one one-way engaging device is effective between each successive nudging for preventing reverse rotation of the second driven member, and said means for drivingly interconnecting said drive shaft and said first driven member including a manually disengageable one-way clutch for enabling control of the drive to said first driven member.

9. A transmission in accordance with claim 8 wherein said manually disengageable one-way clutch comprises a helical spring concentrically disposed around said drive shaft.

10. A transmission in accordance with claim 8 wherein said manually disengageable one-way clutch comprises a helical spring concentrically disposed around said first driven member.

11. A transmission comprising a drive shaft, first and second driven members, means including reduction gearing drivingly interconnecting said drive shaft and said first driven member, and means drivingly interconnecting said drive shaft and said second driven member, said last-named means comprising a pair of one-way engaging devices each having a pair of substantially cylindrical concentric races with a plurality of tiltable wedging devices disposed therebetween and adapted to tilt in one direction into wedging engagement with the races to establish a drive between the races in one direction of rotation and to tilt in this opposite direction to permit relative rotation between the races, the inner race of each of said one-way engaging devices being formed on said second driven member, the outer race of one of the one-way engaging devices being fixed to a stationary part of the transmission for preventing rotation of the second driven member in a reverse direction, the outer race of the other one-way engaging device having a lug projecting therefrom, resilient means operatively disposed between said projecting lug and a stationary part of the transmission and normally effective to bias the outer race of the other one-way engaging device in a direction tending to cause disengagement thereof, eccentric means driven by said drive shaft for successively nudging said lug in opposition to said biasing means for thereby incrementally rotatably advancing said second driven member, whereby said one one-way engaging device is effective between each successive nudging for preventing reverse rotation of the second driven member, means for adjusting the return throw of said outer race of the other one-way engaging device by said biasing means for thereby controlling the amount of each incremental advance of said second driven member and, in turn, controlling the rate of rotation thereof, and said means for drivingly interconnecting said drive shaft and said first driven member including a manually disengageable one-way clutch for enabling control of the drive to said first driven member.

12. A transmission in accordance with claim 11 wherein said manually disengageable one-way clutch comprises a helical spring concentrically disposed around said drive shaft.

13. A transmission in accordance with claim 11 wherein said manually disengageable one-way clutch comprises a helical spring concentrically disposed around said first driven member.

14. A transmission for a manure spreader having manure spreading beaters and an unloading apron, said transmission comprising a drive shaft, a first driven member for driving said beaters and a second driven member for driving said apron, means including reduction gearing and a one-way clutch for drivingly interconnecting said drive shaft and said first driven member, and means drivingly interconnecting said drive shaft and said second driven member, said last-named means comprising a pair of one-way engaging devices each having a pair of substantially concentric races with a plurality of wedging devices disposed therebetween and adapted to move in one direction into wedging engagement with the races to establish a drive between the races in one direction of rotation and to move in the opposite direction to permit relative rotation between the races, one of the races of each of said one-way engaging devices being directly connected with said second driven member, the other race of one of the one-way engaging devices being fixed to a stationary part of the transmission for preventing rotation of the second driven member in a reverse direction, means normally effective to bias the other race of the other one-way engaging device in a direction tending to cause disengagement thereof, and means driven by said drive shaft for successively nudging the other race of the other one-way engaging device in opposition to said biasing means for thereby incrementally rotatably advancing said second driven member, whereby said one-way engaging device is effective between each successive nudging for preventing reverse rotation of the second driven member.

15. A transmission for a manure spreader having manure spreading beaters and an unloading apron, said transmission comprising a drive shaft, first driven member for driving said beaters and second driven member for driving said apron, means including reduction gearing and a one-way clutch for drivingly interconnecting said drive shaft and said first driven member, and means drivingly interconnecting said drive shaft and said second driven member, said last-named means comprising a pair of one-way engaging devices each having a pair of substantially cylindrical concentric races with a plurality of tiltable wedging devices disposed therebetween and adapted to tilt in one direction into wedging engagement with the races to establish a drive between the races in one direction of rotation and to tilt in the opposite direction to permit relative rotation between the races, the inner race of each of said one-way engaging devices being formed on said second driven member, the outer race of one of the one-way engaging devices being fixed to a stationary part of the transmission for preventing rotation of the second driven member in a reverse direction, the outer race of the other one-way engaging device having a lug projecting therefrom, resilient means operatively disposed between said projecting lug and a stationary part of the transmission and normally effective to bias the outer race of the other one-way engaging device in a direction tending to cause disengagement thereof, eccentric means driven by said drive shaft for successively nudging said lug in opposition to said biasing means for thereby incrementally rotatably advancing said second driven member, whereby said one one-way engaging device is effective between each successive nudging for preventing reverse rotation of the second driven member, and means for adjusting the return throw of said outer race of the other one-way engaging device by said biasing means for thereby controlling the amount of each incremental advance of said second driven member and, in turn, controlling the rate of rotation thereof.

16. A manure spreader transmission in accordance with claim 15 wherein said adjusting means comprises a cam and set screw device carried by the outer race of the other one-way engaging device and a stationary part of the transmission for enabling infinite adjustment of the throw of the outer race by said eccentric means.

References Cited in the file of this patent
UNITED STATES PATENTS

| | | |
|---|---|---|
| 2,372,883 | Daub | Apr. 3, 1945 |
| 2,495,988 | Sheppard | Jan. 31, 1950 |

UNITED STATES PATENT OFFICE
CERTIFICATE OF CORRECTION

Patent No. 2,858,712                          November 4, 1958

Herbert A. McAninch et al.

It is hereby certified that error appears in the printed specification of the above numbered patent requiring correction and that the said Letters Patent should read as corrected below.

Column 2, line 71, strike out "driving connection between shaft 16 and pin 24. The" and insert the same after "thereby break the" in line 72, same column; column 3, line 19, for "transmisison" read -- transmission --.

Signed and sealed this 17th day of February 1959.

(SEAL)
Attest:

KARL H. AXLINE
Attesting Officer

ROBERT C. WATSON
Commissioner of Patents